US006992625B1

(12) United States Patent
Krumm et al.

(10) Patent No.: US 6,992,625 B1
(45) Date of Patent: Jan. 31, 2006

(54) CALIBRATION OF A DEVICE LOCATION MEASUREMENT SYSTEM THAT UTILIZES WIRELESS SIGNAL STRENGTHS

(75) Inventors: John C. Krumm, Redmond, WA (US); John C. Platt, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 10/423,093

(22) Filed: Apr. 25, 2003

(51) Int. Cl.
*G01S 3/02* (2006.01)
*G01C 17/00* (2006.01)

(52) U.S. Cl. .................................. 342/451; 702/150
(58) Field of Classification Search ................ 342/464, 342/451, 457, 360
See application file for complete search history.

(56) References Cited

U.S. PATENT DOCUMENTS

| | | | | |
|---|---|---|---|---|
| 5,564,079 A | * | 10/1996 | Olsson ..................... | 455/456.3 |
| 5,602,903 A | * | 2/1997 | LeBlanc et al. .......... | 455/456.2 |
| 6,108,557 A | * | 8/2000 | Wax et al. ................ | 455/456.2 |
| 6,140,964 A | * | 10/2000 | Sugiura et al. ............. | 342/464 |
| 6,161,018 A | * | 12/2000 | Reed et al. .............. | 455/456.1 |
| 6,393,294 B1 | * | 5/2002 | Perez-Breva et al. .... | 455/456.5 |

OTHER PUBLICATIONS

Saha, Diddharta et al, "Location Determination of a Mobile Device Using IEEE 802.11b Access Points," IEEE Wireless Communications and Networking, Mar. 2003, pp. 1987-1992, vol. 3.*
Ladd, Andrew M. et al, "Using Wireless Ethernet for Localization," Proc. of the 2002 IEEE/RSJ Int'l. Conf on Intelligent Robots and Systems, Oct. 2002, pp. 402-408.*
Bernardin, Pete et al, "Estimating Range to the Cell Edge from Signal Strength Measurements," IEEE Vehicular Technology Conference, May 1997, pp. 266-270 vol. 1.*
Bahl, Paramvir et al, "An In-Building RF-Based User Location and Tracking System," IEEE INFOCOMM, 2000, 10 pages.*
Scott Y. Seidel and Theodore S. Rappaport, "914MHz Path Loss Prediction Models for Indoor Wireless Communications in Mulitfloored Buildings", IEEE Transactions on Antennas and Propagation. vol. 40, No. 2, Feb. 1992, 11 pages.
G. Wolfle and F. M. Landstorfer, "Dominant Paths for the Field Strength Prediction", IEEE Vehicular Technology Conference, 1998, 5 pages.
Paramvir Bahl and Venkata N. Padmanabhan, "RADAR: An In-Building RF-based User Location and Tracking System", IEEE INFOCOM, 2000, 10 pages.

(Continued)

*Primary Examiner*—Gregory C. Issing
(74) *Attorney, Agent, or Firm*—Amin & Turocy, LLP (57) ABSTRACT

An architecture for minimizing calibration effort in an IEEE 802.11 device location measurement system. The calibration technique is based upon a regression function that produces adequately accurate location information as a function of signal strength regardless of gaps in the calibration data or minimally available data. The algorithm takes a set of signal strengths from known room locations in a building and generates a function giving (x,y) as a function of signal strength, which function may then be used for the estimation of new locations. Radial basis functions, which are simple to express and compute, are used for regression. The fact that the algorithm maps signal strength to continuous location makes it possible to skip rooms during calibration, yet still evaluate the location in those rooms.

36 Claims, 8 Drawing Sheets

OTHER PUBLICATIONS

Jeffrey Hightower and Gaetano Borriello, "Location Systems for Ubiquitous Computing", 2000, 10 pages.

Paramvir Bahl and Venkata N. Pasmanabhan, "Enhancements to the RADAR User Location and Tracking System", Technical Report, MS-TR-2000-12, Microsoft Research, Feb. 2000, 13 pages.

Jason Small, Asim Smailagic and Daniel P. Siewiorek, "Determining User Location For Context Aware Computing Through the Use of a Wireless LAN Infrastructure", Instatute for Complex Engineered Systems, 2000, 8 pages.

William G. Griswold, Robert Boyer, Steven W. Brown, Tan Minh Truong, Ezekiel Bhasker, Gregory R. Jay, and R. Benjamin Shapiro, "ActiveCampus-Sustaining Educational Communities through Mobile Technology", Department of Computer Science and Engineering, University of California, San Diego, 2002, 19 pages.

Andrew M. Ladd, Kostas E. Berkris, Algis Rudys, Guillaume Marceau, Lydia E. Kavraki and Dan S. Wallach, "Robotics-Based Location Sensing using Wireless Ethernet", MOBICOM, Sep. 2002, 12 pages.

* cited by examiner

CALIBRATION OF A DEVICE LOCATION MEASUREMENT SYSTEM THAT UTILIZES WIRELESS SIGNAL STRENGTHS

TECHNICAL FIELD

This invention is related to IEEE 802.11 devices, and more specifically, to locating wireless devices using wireless signal strengths.

BACKGROUND OF THE INVENTION

Knowledge of locations of users and devices inside a building is an important prerequisite for location-based services and aspects of ubiquitous computing. One promising approach to determining location is through triangulation by measuring IEEE 802.11 wireless signal strengths of wireless devices. One of the most attractive features of an IEEE 802.11 location-based system is that it does not require any extra infrastructure beyond a wireless network that already exists in many buildings. This is in contrast to other person-tracking systems that employ active/passive badges and cameras, which in turn require installation and maintenance of extra equipment.

Using an 802.11 wireless client as a location sensor (e.g., a portable computer as a receiver) is becoming increasingly popular way of enabling location-based services. Triangulation of signal strengths from multiple access points (APs) may be used to pinpoint location of the receiving device down to a few meters. However, this level of accuracy comes at a price of requiring tedious and time-consuming manual labor in order to obtain spatially high-density calibration data of signal strengths as a function of location.

Knowing radio signal strength measurements on a network client from a few different APs, researchers have shown how to compute location down to a few meters. This type of location measurement is especially attractive because it uses existing devices of a building and its users, and because it functions indoors where global positioning system (GPS) and cell phone location signals often break down. However, the accuracy of such systems usually depends on a meticulous calibration procedure that consists of physically moving a wireless client receiver to many disparate known locations, and different orientations, inside the building. It is often be impracticable to expect anyone to spend resources on such work—when presented with such prospect as part of a new product, software product planners often balk, complaining that system administrators are reluctant to even keep locations of printers updated, much less create and maintain a high-resolution table of IEEE 802.11 signal strengths.

One alternative to manual calibration is to analytically predict signal strengths based on a floor plan of a building, physical simulation of radio frequency (RF) propagation, and knowledge of the locations of wireless access points. It was discovered, for the chosen simulation method, that physically simulating signal strengths increased median location error by approximately 46% (from 2.94 meters to 4.3 meters) over values obtained by manual calibration. Moreover, a good physical simulation usually requires a more detailed model of the building than is normally available.

In the realm of IEEE 802.11 locations, one published work was based on the RADAR system, an in-building RF-based location and tracking system. RADAR worked based on a table of indoor locations and corresponding signal strengths. Using a manually calibrated table, the nearest neighbor algorithm gave a median spatial error of approximately 2.94 meters. Another table based on simulated radio wave propagation allowed the avoidance of most of the calibration work at the cost of increasing the median error to 4.3 meters. The RADAR work also looked at the problem of reducing calibration effort. It was found that reducing the number of calibration points from seventy to forty had only a small negative impact on accuracy. In follow-on work, RADAR was enhanced to use a Viterbi-like algorithm on short paths through the building. This further reduced the median error to approximately 2.37 meters.

As part of Carnegie Mellon's Andrew system, a limited study of an IEEE 802.11 location system was performed using eight discrete locations in a hallway. A table of signal strength versus location was built. It was determined that upon returning to the eight locations, the system inferred the right location 87.5% of the time.

Another location service used signal-to-noise ratios, instead of the more commonly used raw signal strengths. The location algorithm was a Bayesian network, manually trained at discrete locations in two buildings. The Bayes formulation allowed the inclusion of a priori probabilities of a person's location, as well as transition probabilities between locations. In one test on twelve locations in a hallway, the service was capable of identifying the highest probability to the correct location 97% of the time, not counting the 15% of the time it was inconclusive.

In still another study, IEEE 802.11 was used to compute the location of wireless PocketPCs, both indoors and outdoors. Instead of manual calibration, a formula was used that approximated the distance to a wireless access point as a function of signal strength. Using a hill-climbing algorithm, the system computes location down to about ten meters (approximately thirty-five feet) using signal strengths from multiple access points.

In yet another study of an IEEE 802.11 location system, Bayesian reasoning and a hidden Markov model were used. Not only were signal strengths taken into account, but also the probability of seeing an access point from a given location. Like other work, it was based upon a manual calibration. The system explicitly modeled orientation and achieved a median spatial error of approximately one meter using calibration samples taken approximately every 1.5 meters in hallways. Although in terms of accuracy, this may be perhaps the best result, the study also acknowledges the problem of calibration effort, and suggests that calibrated locations could be automatically inferred by outfitting the calibrator with an accelerometer and magnetic compass.

Some of the conventional systems described hereinabove are explicitly working toward more accuracy, but at the expense of increased calibration effort.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises an IEEE 802.11 location-based technique for coarsely calibrating a system used to determine a precise triangulated location in view of radio signal strengths at a given location. The calibration technique is based upon a regression function that produces adequately accurate location information as a function of signal strength regardless of gaps in the calibration data or minimally available data.

Since rooms are natural spatial fiducials in buildings, and assuming that manual calibration is the principal method for some time, the architecture of the present invention discloses a new IEEE 802.11 location system based upon a relatively easy calibration procedure of recording signal strengths down to room resolution (e.g., from an arbitrary point or set of points in each room of the building or from a more precise location within each room). The disclosed location algorithm is designed to work in spite of missing calibration data, that is, data that is unobtainable because a room, set of rooms, or even a building wing, may be inaccessible. The regression algorithm takes a set of signal strengths from known locations in a building and generates a function that maps signal strength to (x,y) location. This function may then be used to estimate new location(s). Radial basis functions, which are simple to express and compute, are used for regression.

The fact that the algorithm regresses on signal strength to provide location makes it possible to skip rooms during calibration, yet still evaluate locations in those rooms.

This is more difficult with most conventional IEEE 802.11 location algorithms that instead must classify signal strengths into only previously seen locations. Although accuracy goes down with reduced calibration data, it goes down surprisingly little. The results quantify the tradeoff between accuracy and effort, and suggest a prescription for manually calibrating systems of this type.

One embodiment provides a more precise location measurement methodology, where calibration is accomplished by placing the receiver at one point at the location to be measured, and measuring signal properties based upon that single receiver location. The user selects the approximate location of the receiver on a map that shows the position of the receiver relative to the location to be measured. Additionally, an averaging function is provided that averages the last ten computed (x,y) locations to further reduce noise.

In a second embodiment that is less precise, the user moves the receiver around at the location, e.g., in the room, while taking measurements at several calibration points. Thus the exact location of the receiver is not known. For purposes of calibration, the location of the receiver is taken as the (x,y) centroid of the room, no matter where in the room the receiver was located when the measurements were made.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the terms "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The disclosed calibration architecture supports the premise that calibration efforts can be significantly reduced with only a minor reduction in spatial accuracy. This effectively diminishes one of the most daunting practical barriers to wider adoption of an IEEE 802.11 location-based measurement technique.

Figure 1:
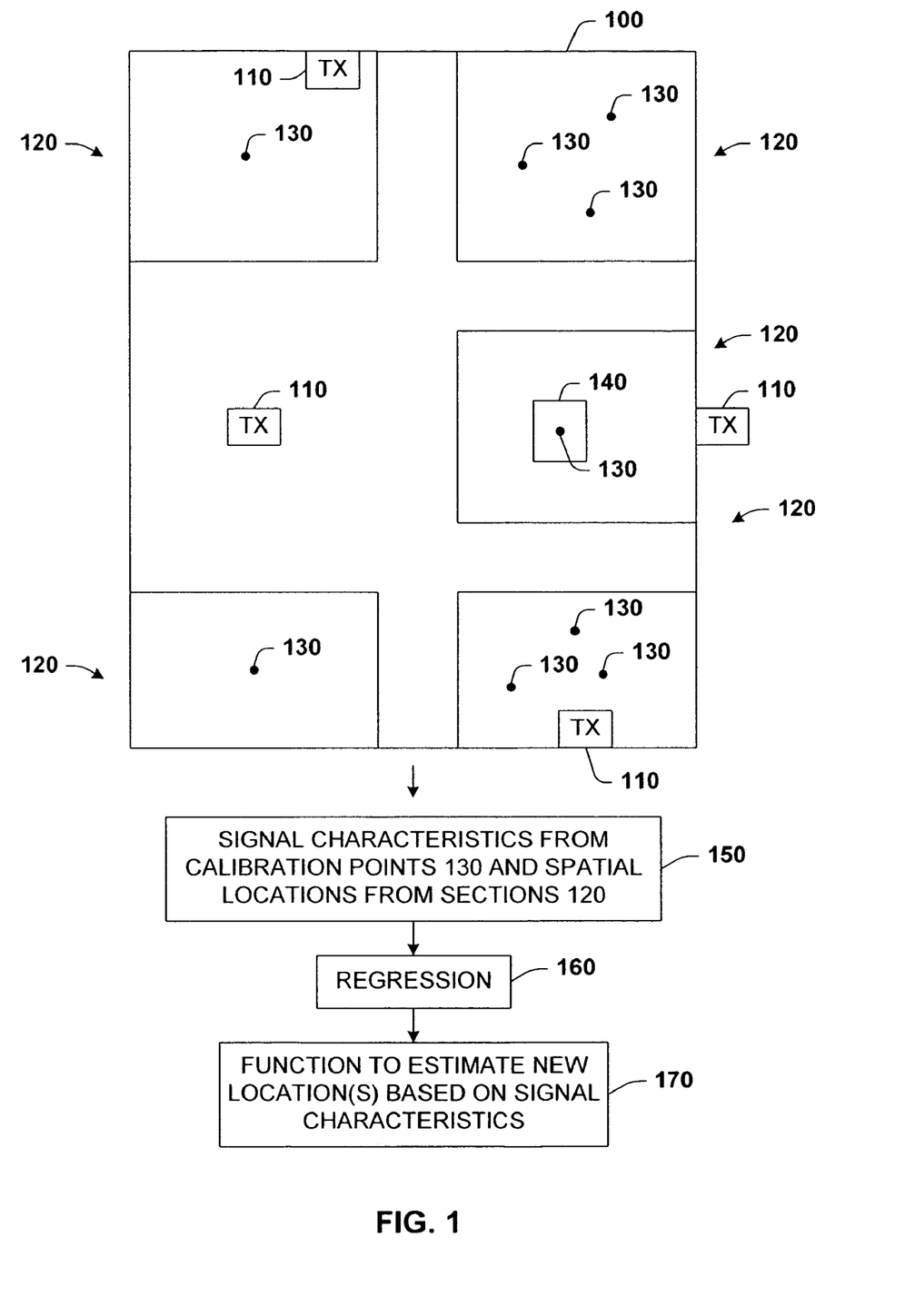
FIG. 1 illustrates the geometry of the calibration procedure for a system that determines new location(s) based on signal characteristics.

Referring now to FIG. 1, there is illustrated geometry of the calibration procedure for a system of the present invention that determines new location(s) based on signal characteristics. These new location(s) are expected to be within a region 100. Region 100 may be a building, a floor of a building, or any other region that has coverage by one or more transmitters 110. The transmitters 110 may be located internal and external to the region 100. In order for the location system to be able to determine at least an (x,y) location, there must be at least three transmitters 110 whose signal characteristics can be measured in the region 100. These transmitters 110 may be, but are not required to be, for example, access point (AP) transceivers disposed on a network. However, for purposes of this description, the phrase "transmitting device" and the term "transmitter(s)" should be understood to include any device that may or may not be disposed on a network and that transmits a signal.

Region 100 is divided into sections 120, which sections 120 may include, for example, rooms, hallways, or lounges in a building, and thus may be of variable size. Alternatively, the sections 120 may be particular locations within rooms. The transmitters 110 are not necessarily located in the sections 120. Furthermore, there can be additional areas of region 100 that are not divided into sections 120.

The sections 120 may contain one or more calibration points 130. During calibration, a receiver 140 is placed sequentially at every calibration point 130. For each calibration point 130, one or more signal characteristics of every receivable transmitter 110 are recorded. In one embodiment, the transmitters 110 are transceivers that are compliant with an IEEE 802.11 standard and the signal characteristics are the signal strengths of the transmitters 110, measured at the calibration point 130. Also, for each calibration point 130, the identity of the corresponding section 120 is recorded. The identity of the corresponding section 120 can be indicated, for example, by a user selecting a section from a map. The spatial location of all sections 120 are also required for calibration. These spatial locations can be the centroid of the spatial extent of each section 120.

In another embodiment, there is only one calibration point 130 for each section 120. The calibration point 130 is located at a known location inside each section 120. The signal characteristics are then measured multiple times, while the receiver 140 is rotated in place at the single calibration point 130. The spatial location of section 120 is taken to be the spatial location of the calibration point 130.

In yet another embodiment, there are multiple calibration points 130 for each section 120. These calibration points 130 are chosen to be scattered throughout the section 120. The signal characteristics may be measured one or more times for each calibration point 130. The spatial location of section 120 is taken to be the centroid of the section 120.

With any of the embodiments, the signal characteristics are measured by receiver 140 at all calibration points 130 and the spatial locations from all sections 120 are gathered, at act 150. Regression is then performed upon this data, at act 160. Regression operates on the gathered data to produce a regression function, as indicated at an act 170, which can be used subsequently to estimate new location(s) throughout the region 100 based on newly measured signal characteristics. These new location(s) are not constrained to lie on the calibration points 130. Indeed, they are not even constrained to lie within sections 120; they can occur at locations that are inaccessible at the time of calibration.

Figure 2:
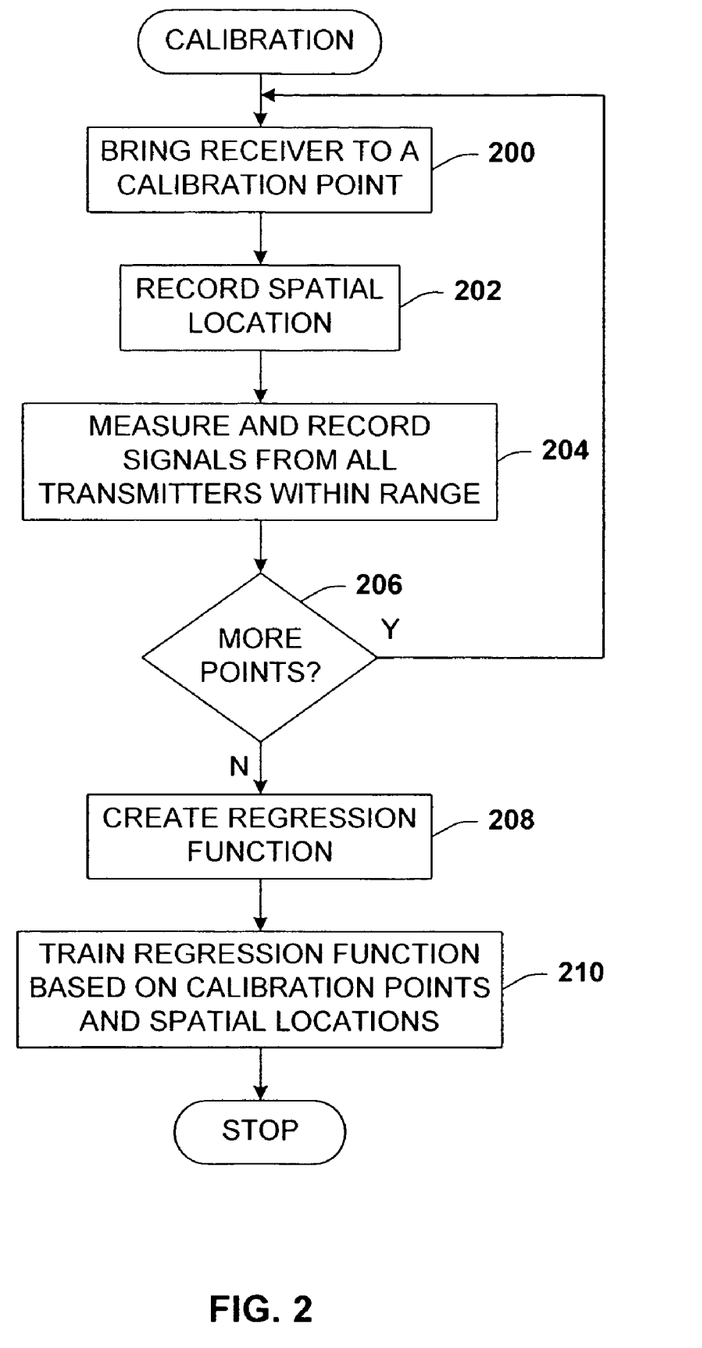
FIG. 2 illustrates a flow chart of the general calibration process of the present invention.

Referring now to FIG. 2, there is illustrated a flow diagram of a general calibration process in accordance with the present invention. While, for purposes of simplicity of explanation, the methodology of FIG. 2, and any subsequent methodologies in, e.g., the form of flow charts, are shown and described herein as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, the receiver is brought to a calibration point 130. At 202, the spatial location of the receiver is then recorded. Note that recording of the spatial location information need not be performed at each calibration point, but may be recorded only once during calibration of a section 120. The receiver then measures and records signal strengths of one or more transmitters of the location, as indicated at 204. At 206, if the signal strengths at more calibration points 130 must be measured, flow returns to 200 to bring the receiver to that next calibration point 130, and continue the measurement and recording process for that calibration point 130. If no other calibration point 130 must be measured, flow proceeds from 206 to 208, to create a regression function. This regression function is trained via regression. The training set comprises the signal strengths measured at calibration points 130 and the spatial locations of sections 120. The regression function is then determined that provides position in (x,y) coordinates as a function of signal strengths over the entire region 100. Alternatively, the regression function may provide (x,y,z) coordinates, if the region 100 extends over multiple floors of a building.

Figure 3:
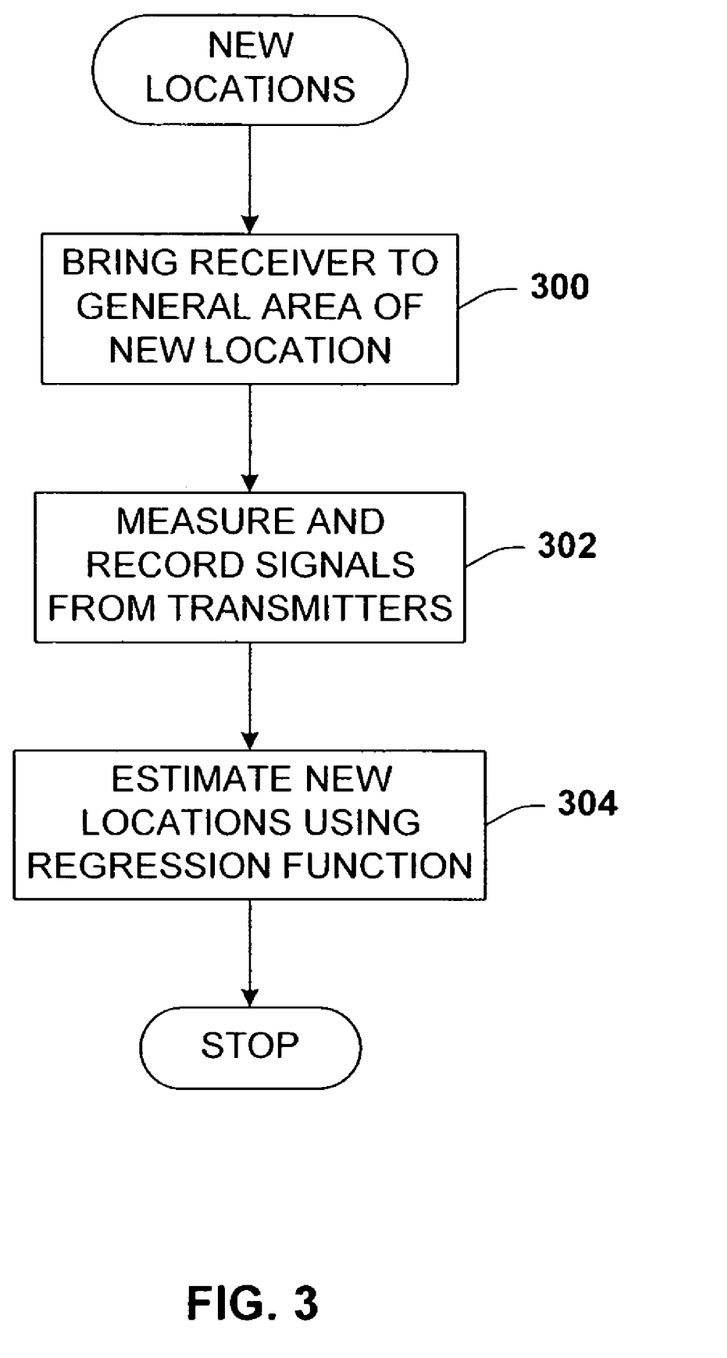
FIG. 3 illustrates a flow chart of a process for determining new location information.

Referring now to FIG. 3 there is illustrated a flow diagram of a process for determining new location(s). At 300, a receiver is brought to a general area of the new location. This location may be one that was previously visited or a location that is being visited for the first time. Signal strengths are then measured and recorded, as indicated at 302. The signals may be received from any transmitters associated with region 100. At 304, the regression function is employed to estimate new location(s) within region 100, based on the signal strengths measured by the receiver at 302. The process then reaches a Stop block.

The Algorithm

Figure 4:
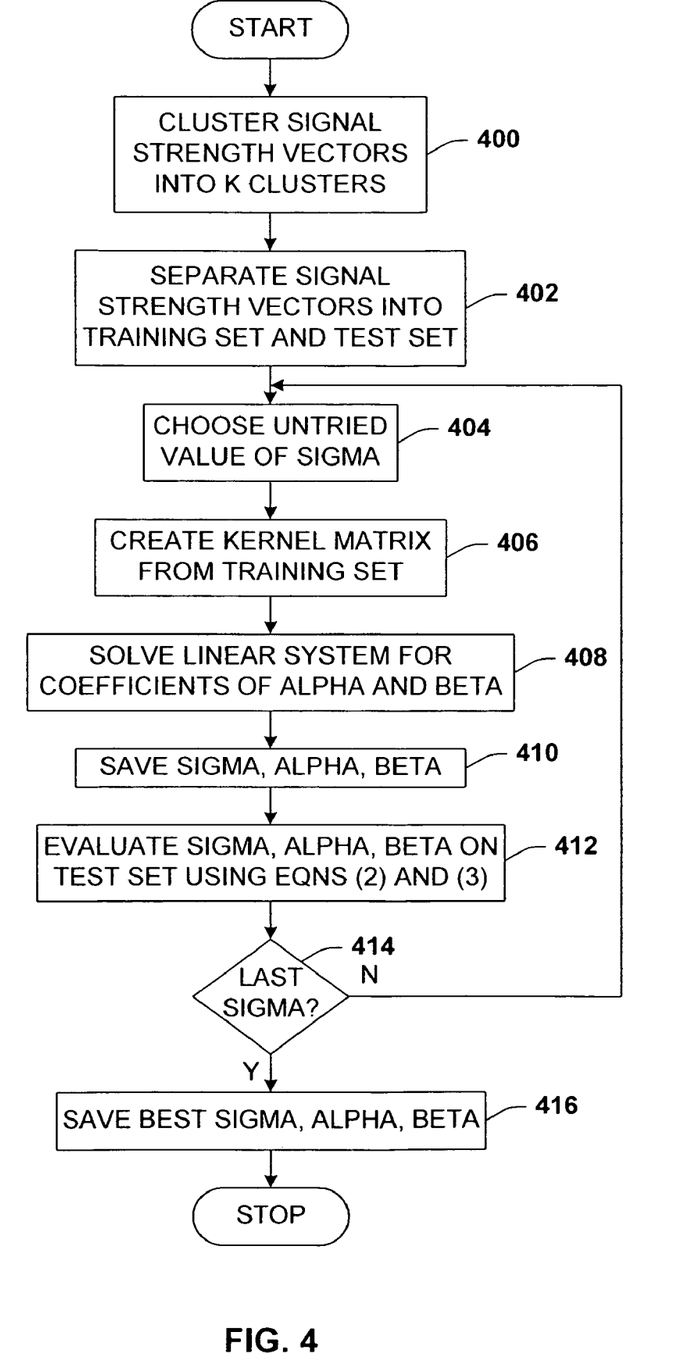
FIG. 4 illustrates a more detailed flow chart of the process for determining the mapping from signal strengths to (x,y) location in accordance with the present invention.

Referring now to FIG. 4, there is illustrated a more detailed flow diagram of the process for determining mapping from signal strengths to (x,y) location in accordance with the present invention. At 400, signal strength vectors from every section 120 are clustered into K clusters. At 402, all signal strength vectors are separated into a training set and a test set of vectors. At 404, an untried value of sigma ($\sigma$) is chosen. At 406, a kernel matrix is created from the training set. At 408, the linear system is solved for coefficients of alpha ($\alpha$) and beta ($\beta$). At 410, the values of sigma ($\sigma$), alpha ($\alpha$), and beta ($\beta$) are saved. At 412, sigma ($\sigma$), alpha ($\alpha$), and beta ($\beta$) are evaluated on the test set utilizing Equations (2) and (3). At 414, it is determined if the last sigma ($\sigma$) has been reached. If NO, flow proceeds back to the input of 404 to choose another untried sigma ($\sigma$). If YES, flow is to 416 to save the best sigma ($\sigma$), alpha ($\alpha$), and beta ($\beta$).

Following is a detailed description of the algorithm and associated equations.

In order to facilitate understanding of the mathematics discussed infra, each set of calibration signal strength readings is designated with a vector $s_i$, where i indexes over substantially all calibration vectors in substantially all the room locations. Each calibration vector has a corresponding $(x_i, y_i)$ giving the location from which it was taken. This may be the centroid of the spatial extent of section 120 or wherever the receiver is placed. Each signal strength vector $S_i$ has a plurality of elements, one element for each transmitter receivable in region 100. The elements in $S_i$ corresponding to transmitters that were not sensed at the calibration point 130 were given a value of one less than the minimum signal strength seen for the whole experiment. The signal strengths are returned from a WRAPI (Wireless Research Application Programming Interface) library as integers in units of dBm, where dBm=10 $\log_{10}$ (milliwatts).

Many conventional IEEE 802.11-based location studies have formulated the task of location measurement as a classification problem, where the goal is to classify the signal strength vector into a discrete set of locations. This includes the probabilistic formulations where the classification result is given as a set of probabilities over all the possible locations. However, the classification formulation is unsuitable for a goal of completely skipping certain rooms during the calibration phase. If a trained classifier has never seen a certain room, it will not ever classify data as coming from that room.

Instead, the present invention uses regression to form the regression function that maps signal strength vector(s) into locations. Thus, the present invention can map a signal strength vector into a new location that has never been calibrated. If classification (rather than regression) is still desired, a post-processing check can be made to determine which room, if any, contains the estimated location.

Following is a description of how the signal strengths measured in accordance with the embodiments of FIG. 1 are used to generate the regression function that gives location as a function of the signal strength vector, after which the number of calibration vectors is reduced in a principled way to see how reducing the amount of calibration data affects the accuracy of location measurement.

Regression fits a function to the calibration vectors $s_i$ and the corresponding room coordinates $(x_i, y_i)$. The present invention utilizes kernel regression, which estimates new location(s) via the formula $$x(s) = c_x + \sum_{j=0}^{M-1} \alpha_j K(\|s - s^*_j\|), \text{ and} \quad (1)$$

$$y(s) = c_y + \sum_{j=0}^{M-1} \beta_j K(\|s - s^*_j\|);$$

where $K(r)$ is a chosen kernel function, $s^*_j$ are the chosen kernel function centers, and $\alpha_j$ and $\beta_j$ are the computed weights based on calibration data. The Euclidean distance r between an observed signal strength vector s and a stored signal strength vector $s^*_j$ is shown by $\|s-s^*_j\|$. The offset $(c_x, c_y)$ can be computed in a number of ways, as is known in the art of machine learning. In one embodiment, the offset is simply the centroid of the training data, i.e., $$(c_x, c_y) = \frac{1}{N}\left(\sum_{i=0}^{N-1} x_i, \sum_{i=0}^{N-1} y_i\right); \quad (2)$$

where N is the number of calibration vectors (in the application provided herein, the number is 28,114).

In the embodiment of FIG. 1, the kernel function is chosen to be an isotropic Gaussian kernel function:

$$K(r) = \exp\left(-\frac{r^2}{2\sigma^2}\right). \quad (3)$$

where $\sigma$ is the radius, and r is the Euclidean distance $\|s-s^*_j\|$.

This choice of kernel function also requires a choice of scale parameter sigma ($\sigma$), which is described below. Additionally, the choice of the M kernel centers $s^*_j$ is also described below.

The present invention uses a least-squares fit to compute the weights $\alpha_j$ and $\beta_j$ based on the calibration data. To compute the $\alpha_j$ (for the x coordinate), the squared error is minimized between the calibration data and $x(s_i)$, which is, $$err = \sum_{i=0}^{N-1}\left(x_i - c_x - \sum_{j=0}^{M-1} \alpha_j K_{ij}\right)^2, \quad (4)$$

where $K_{ij}=K(\|s_i-s^*_j\|)$. Minimizing with respect to $\alpha_j$ gives a linear equation that can be solved for the vector $a=(\alpha_0, \alpha_1, \ldots, \alpha_{M-2}, \alpha_{M-1})^T$:

$$K^T K a = K^T x \quad (5)$$

Here K is an N×M matrix of $K_{ij}$, and $x=(x_0-c_x, x_1-c_x, \ldots, x_{N-2}-c_x, x_{N-1}-c_x)^T$. Analogously, $\beta_j$ is obtained from $K^T K \beta = K^T y$.

Note that $K^T K$ has size M×M, where M is a chosen number of stored signal strength vectors. $K^T K$ is a kernel matrix. One possible choice is to let each calibration point $S_i$ serve as a stored signal strength vectors, giving M=N. Solving Equation (5) with M larger than 27,000 (as is used in the embodiment of FIG. 1) would be extremely computationally intensive. In addition, the regression function produced when M=N may not smoothly generalize between calibration points 130. Instead, the signal strength calibration vectors were clustered in each location, and the cluster centers were used as kernel centers. Using a standard k-means algorithm, computing k=5 signal strength clusters in each room, results in less than 700 kernel centers to represent all 118 rooms on the test floor.

If the uncertainty of the location of calibration points 130 is known, each term in Equation (4) may be weighted by the inverse of the variance of the uncertainty for its corresponding calibration point. In the art, this is known as heteroscedastic regression.

The only remaining choice was for the scale parameter $\sigma$. A simple linear search was performed over possible values of $\sigma$. For each candidate $\sigma$, the weights a and $\beta$ were computed first using 70% of the calibration data. The candidates were evaluated using the remaining disjoint 30%. The system picked the $\sigma$ that gave the least rms distance error in (x,y). In spite of the 70/30 split for computing $\sigma$, 100% of the calibration data was used to cluster for the kernel centers.

As previously indicated, an optional step is to average together the results of the last several locations to reduce noise. The last ten (x,y) results were averaged together.

As mentioned previously, a second set of test vectors were taken a few days separated from the training data. Using the embodiment where one calibration point 130 is taken per section 120, the second set numbered 25,457 readings to serve as test data.

When testing this data, the kernel regression method yielded an rms error of approximately 3.75 meters. Computation of the rms error is known in the art, and thus not shown here.

APPLICATION EXAMPLES

As indicated above, the location algorithm of the present invention works based on regression of signal strength training data taken from known room locations.

Figure 5:
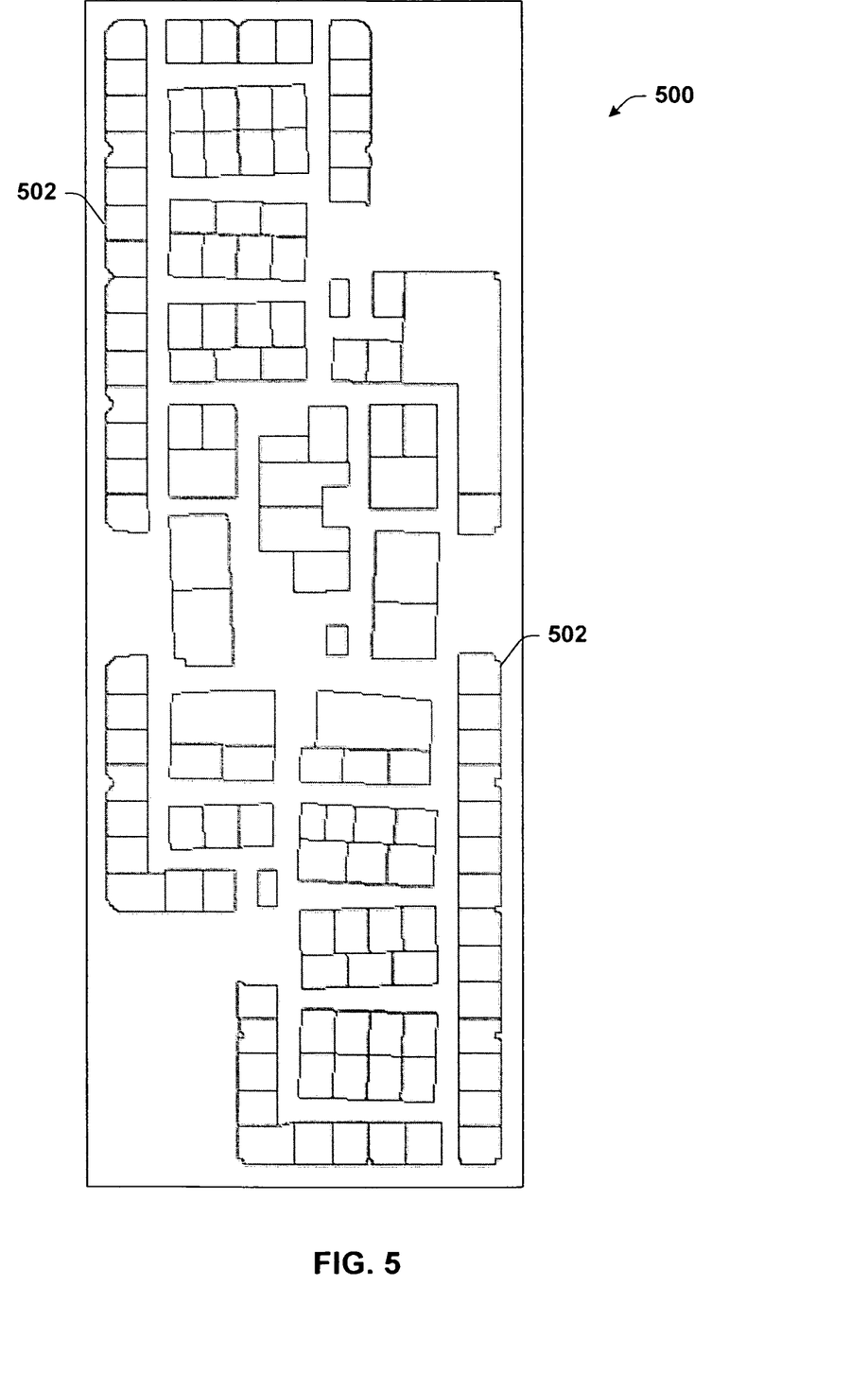
FIG. 5 illustrates a layout of a typical office floor of rooms utilized for a sample application of the calibration process of the present invention.

Referring now to FIG. 5, there is illustrated a layout of a typical office floor 500 of rooms 502 utilized for a sample application of the calibration process of the present invention. The floor 500 includes 132 rooms 502 of which 118 were accessible. The area of the floor 500 is approximately 2,680 square meters. The floor was taken to be region 100. The building maps of the floors were extracted both as polygon representations and bitmaps. The coordinates of all maps were expressed in actual floor coordinates in meters. The algorithm was evaluated on the one floor 500 with the 118 different rooms.

To study the problem of calibration effort, the amount of calibration data was reduced as if less time was spent in each room and as if certain rooms had been skipped. The 118 rooms were split into 137 sections, since in larger rooms, e.g., conference rooms, more receiver locations were used. The receiver locations were noted by making the location selection utilizing the map via the interface of FIG. 6, described hereinbelow. The results indicated a calibration location for every 19.5 square meters. For calibration, each accessible section was entered with a wirelessly connected receiver, e.g., the portable PC, running the logging program. The logging program used the WRAPI interface to obtain signal strengths from all the visible IEEE 802.11 transmitters. The receiver measured signals for approximately sixty seconds in each location. Additionally, the receiver was oriented in a number of different ways to factor out orientation effects. A scan rate of 3.4 Hz was used providing approximately 200 scans for each location. Each scan yielded the set of signal strengths and the MAC (Media Access Controller) addresses of the wireless access points. On average, the wireless communication interface could "see" 3.9 AP's at any given time. As previously indicated, the first set of signal strength readings numbered 27,796, and the second set, taken a few days later to serve as test data, numbered 25,457.

As a way of reducing noise and increasing accuracy, a running average filter was applied to the computed location vectors. The filter was ten samples long, which induced a delay of approximately 2.9 seconds at the scan rate of 3.4 Hz.

To test the effect of reduced time, the first s seconds of calibration data were processed with the same training algorithm, and then tested with the entire test set. Accuracy does not suffer significantly even when the time spent in each location is only ten seconds. At ten seconds, the rms error had only increased by approximately 12% (or 0.45 meters) from the rms error at sixty seconds. At a data rate of 3.4 Hz, ten seconds of data yielded only thirty-four signal strength vectors. This indicates that it is not necessary to spend much time at each location during calibration.

The effect of reducing the number of calibration locations from the original full set of 137 locations down to 10% of the original was tested. To choose k locations from the original calibration set, a k-means clustering algorithm was run on the original locations to make k clusters. The k original locations nearest the k cluster centroids were chosen as those for calibration. As determined, the rms error grows as the number of locations decreases. However, even at 50%, the rms error has only grown by 20% (0.74 meters), and at 20%, has grown by 42% (1.59 meters). At 10% of the original locations, the rms error is 9.19 meters, which is an increase of 145% (5.44 meters) over the best result at 100%. Therefore, this shows that there is a significantly diminishing return for moving to a denser set of calibration points. This experiment also suggests a way to choose calibration points in a space by starting with a dense set, for example, at the centroid of every room, and use k-means to cluster the set into a representative sub-sample.

Furthermore, both the time spent at each location and the number of locations can be significantly reduced with only a minor degradation in accuracy. For example, spending thirty seconds in 40% of the locations increases the rms error by only approximately 21% (from 3.75 meters to 4.55 meters), yet reduces the calibration effort by much more than half.

Figure 6:
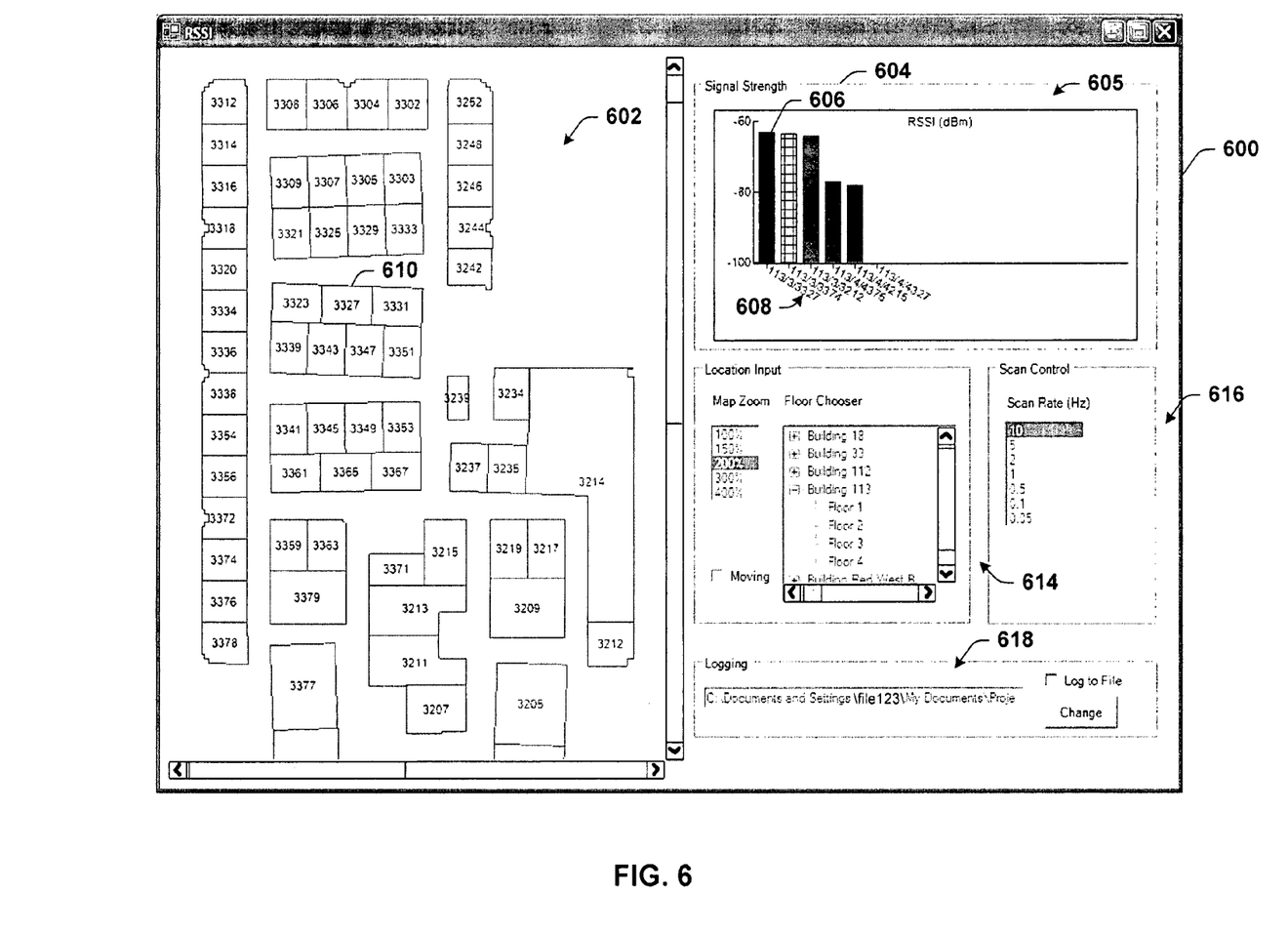
FIG. 6 illustrates an exemplary screenshot of a graphical user interface for facilitating signal strength logging of the calibration data.

Referring now to FIG. 6, there is illustrated an exemplary screenshot of a graphical user interface (GUI) 600 for facilitating signal strength logging of the calibration data. The GUI 600 facilitates the display of a floor graphical representation 602 of the floor 500, and rooms thereof. The user indicates the location of the receiver by selecting a room from the floor representation 602 via a mouse, keyboard, or other conventional input device. Additionally, there is presented a signal strength subwindow 604 for presenting a signal strength indicator plot 605 that displays a representation of the measured signal strengths from nearby transmitters. For example, a first bar 606 includes a first color or fill pattern that indicates the signal was received from a transmitter on the current floor being calibrated. Associated with the bar 606 is data 608 that indicates the signal strength data, the floor on which the room is located, and the room number of the transmitter (i.e. 113/3/3327). In this particular example, the transmitter was in building number (113), room number 3327 (also denoted graphically at 610) of the third floor (3).

A second bar identification 612 may be used to indicate measurements received from transmitters on floors other than the current floor being calibrated. The bar 612 is associated with room 113/4/4327, which is a room 4327 on the fourth floor of building 113. It is to be appreciated that the GUI can be programmed to provide a wide variety of graphical responses to measure signals, including flashing bars, and text, audio output signals, etc., commonly available for providing such interface features.

The interface 600 also includes a Location Input subwindow 614 that allows the user to zoom in on a floor map via a Map Zoom subwindow, and choose a floor for calibration via a Floor Chooser subwindow.

The interface 600 further includes a Scan Control subwindow 616 for selecting the scan rate (in Hertz) for signal detection. The user can also direct logging of the data to a location on the receiving device via a Logging path field 618. The user may also select a remote network storage location by entering the corresponding network path in the path filed 618. Once entered, all data is automatically stored in the designated file location.

At first glance, an rms error of approximately 3.75 meters for the location system seems much worse than previous conventional studies obtaining a median error of approximately 2.94 meters in a first conventional experiment or approximately one meter for a second conventional experiment. However, both of these conventional systems required much more calibration effort. The first conventional experiment covered hallway outside of about fifty-four rooms with seventy calibration points. The second conventional experiment covered the hallway with calibration points approximately 1.5 meters (five feet) apart. In contrast, the disclosed examples used one calibration point per room on rooms with an average center-to-center spacing of approximately 2.85 meters. The other efforts also took much more care in making sure the locations of the calibration points were known. While the above first and second conventional experiments show what is achievable with a careful calibration, the disclosed methodology illustrates what is achievable with a practical one.

One barrier to deploying an IEEE 802.11-based location system is the calibration effort. In the disclosed example, approximately four hours were spent calibrating 118 rooms on one floor of the building. It is desirable to know if this amount of calibration is really necessary. In particular, it is desirable to evaluate the effect of reducing the time spent in each room and reducing the number of rooms visited. By training on subsets of the original training data, the effects of reducing the time and number of rooms was simulated.

In summary, calibration for IEEE 802.11-based location can be very tedious. In the disclosed application example, one floor of an office building was calibrated down to room resolution, which approximates what could be expected for a large-scale deployment of an IEEE 802.11 location system. Using radial basis functions to interpolate location as a function of signal strength, an rms error of approximately 3.75 meters was achieved on rooms whose mean spacing was approximately 3.27 meters. By formulating the problem as one of interpolation, it is possible to make the calibration process easier by skipping a significant fraction of the rooms. Additionally, it is unnecessary to spend much time in each room, as more time beyond a short minimum does not improve accuracy very much.

In an alternative implementation, instead of measuring the strength of multiple transmitters from a single receiver at various calibration locations, the disclosed invention is equally applicable to determining the location of a transmitter by fixing a number of receivers at known locations and measuring the strength of a single transmitter at various calibration locations. The latter would be applicable to the case where the transmitter is a source of audio (e.g., a human), while the receiver is a set of audio microphones.

In a further alternative embodiment, calibration and regression need not operate on signal strength. Various signal properties can be used, such as phase, autocorrelation, or spectrum. Regression can apply equally well to these alternative signal properties, even if each property itself is not a scalar. The input to a kernel regression system would then consist of a vector that comprises multiple vectors of signal properties, appended together.

Figure 7:
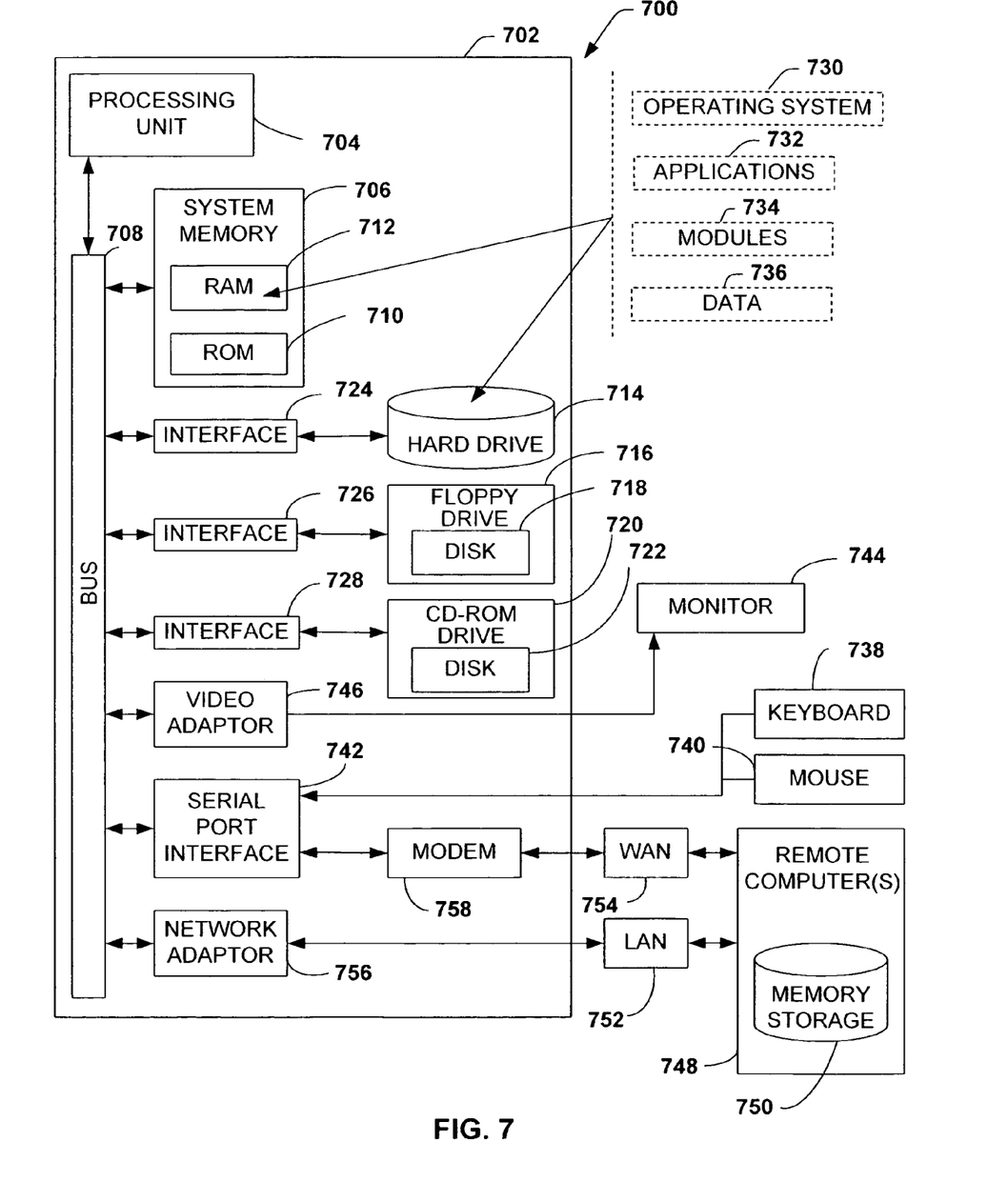
FIG. 7 illustrates a block diagram of a computer operable to execute the disclosed architecture.

Referring now to FIG. 7, there is illustrated a block diagram of a computer operable to execute the disclosed architecture. In order to provide additional context for various aspects of the present invention, FIG. 7 and the following discussion are intended to provide a brief, general description of a suitable computing environment 700 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 7, there is illustrated an exemplary environment 700 for implementing various aspects of the invention includes a computer 702, the computer 702 including a processing unit 704, a system memory 706 and a system bus 708. The system bus 708 couples system components including, but not limited to the system memory 706 to the processing unit 704. The processing unit 704 may be any of various commercially available processors. Dual microprocessors and other multiprocessor architectures also can be employed as the processing unit 704.

The system bus 708 can be any of several types of bus structure including a memory bus or memory controller, a peripheral bus and a local bus using any of a variety of commercially available bus architectures. The system memory 706 includes read only memory (ROM) 710 and random access memory (RAM) 712. A basic input/output system (BIOS), containing the basic routines that help to transfer information between elements within the computer 702, such as during start-up, is stored in the ROM 710.

The computer 702 further includes a hard disk drive 714, a magnetic disk drive 716, (e.g., to read from or write to a removable disk 718) and an optical disk drive 720, (e.g., reading a CD-ROM disk 722 or to read from or write to other optical media). The hard disk drive 714, magnetic disk drive 716 and optical disk drive 720 can be connected to the system bus 708 by a hard disk drive interface 724, a magnetic disk drive interface 726 and an optical drive interface 728, respectively. The drives and their associated computer-readable media provide nonvolatile storage of data, data structures, computer-executable instructions, and so forth. For the computer 702, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 712, including an operating system 730, one or more application programs 732, other program modules 734 and program data 736. It is appreciated that the present invention can be implemented with various commercially available operating systems or combinations of operating systems.

A user can enter commands and information into the computer 702 through a keyboard 738 and a pointing device, such as a mouse 740. Other input devices (not shown) may include a microphone, an IR remote control, a joystick, a game pad, a satellite dish, a scanner, or the like. These and other input devices are often connected to the processing unit 704 through a serial port interface 742 that is coupled to the system bus 708, but may be connected by other interfaces, such as a parallel port, a game port, a universal serial bus ("USB"), an IR interface, etc. A monitor 744 or other type of display device is also connected to the system bus 708 via an interface, such as a video adapter 746. In addition to the monitor 744, a computer typically includes other peripheral output devices (not shown), such as speakers, printers etc.

The computer 702 may operate in a networked environment using logical connections to one or more remote computers, such as a remote computer(s) 748. The remote computer(s) 748 may be a workstation, a server computer, a router, a personal computer, portable computer, microprocessor-based entertainment appliance, a peer device or other common network node, and typically includes many or all of the elements described relative to the computer 702, although, for purposes of brevity, only a memory storage device 750 is illustrated. The logical connections depicted include a local area network (LAN) 752 and a wide area network (WAN) 754. Such networking environments are commonplace in offices, enterprise-wide computer networks, intranets and the Internet.

When used in a LAN networking environment, the computer 702 is connected to the local area network 752 through a network interface or adapter 756. The adaptor 756 may facilitate wired or wireless communication to the LAN 752, which may also include a wireless access point disposed thereon for communicating with the wireless adaptor 756. When used in a WAN networking environment, the computer 702 typically includes a modem 758, or is connected to a communications server on the LAN, or has other means for establishing communications over the WAN 754, such as the Internet. The modem 758, which may be internal or external, is connected to the system bus 708 via the serial port interface 742. In a networked environment, program modules depicted relative to the computer 702, or portions thereof, may be stored in the remote memory storage device 750. It will be appreciated that the network connections shown are exemplary and other means of establishing a communications link between the computers may be used.

Figure 8:
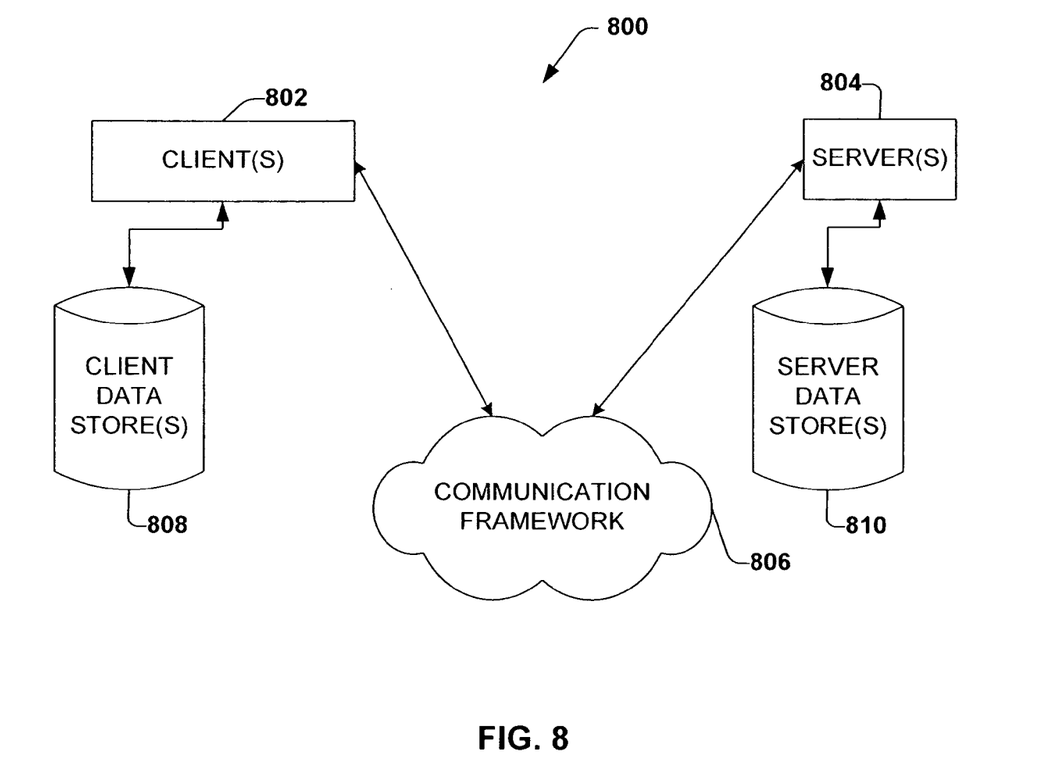
FIG. 8 illustrates a schematic block diagram of an exemplary computing environment in accordance with the present invention.

Referring now to FIG. 8, there is illustrated a schematic block diagram of an exemplary computing environment 800 in accordance with the present invention. The system 800 includes one or more client(s) 802. The client(s) 802 can be hardware and/or software (e.g., threads, processes, computing devices). The client(s) 802 can house cookie(s) and/or associated contextual information by employing the present invention, for example. The system 800 also includes one or more server(s) 804. The server(s) 804 can also be hardware and/or software (e.g., threads, processes, computing devices). The servers 804 can house threads to perform transformations by employing the present invention, for example. One possible communication between a client 802 and a server 804 may be in the form of a data packet adapted to be transmitted between two or more computer processes. The data packet may include a cookie and/or associated contextual information, for example. The system 800 includes a communication framework 806 that can be employed to facilitate communications between the client(s) 802 and the server(s) 804. Communications may be facilitated via a wired (including optical fiber) and/or wireless technology. The client(s) 802 are operably connected to one or more client data store(s) 808 that can be employed to store information local to the client(s) 802 (e.g., cookie(s) and/or associated contextual information). Similarly, the server(s) 804 are operably connected to one or more server data store(s) 810 that can be employed to store information local to the servers 804.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of calibrating a system used to determine new location(s) depending on observed signal properties, comprising:

measuring signal properties related to identified locations; and generating a regression function based at least in part upon the signal properties, the function estimating new location(s) as a function of observed signal properties, the regression function comprising a plurality of kernel functions, each kernel function computing the difference between a vector of observed signal properties and a vector of stored signal properties.

2. The method of claim 1, the kernel functions being isotropic Gaussian kernel functions.

3. The method of claim 1, the vectors of stored properties are computed by clustering a plurality of vectors of measured signal properties.

4. The method of claim 1, the regression function further comprising weights and a scale parameter such that each kernel function depends on the scale parameter, the scale parameter determined by further, selecting a plurality of the scale parameter values;

for each scale parameter value, fitting the weights to a first subset of the signal properties using the scale parameter value;

evaluating the regression function using the fitted weights on a second subset of the signal properties, the second subset being disjoint from the first subset;

selecting a best scale parameter where the regression function obtains the least location error on the second subset of the signal properties; and storing the best scale parameter and corresponding weights.

5. The method of claim 1, the regression function comprising weights, and the act of generating the regression function comprises fitting the regression function to the measured signal properties by adjusting the weights.

6. The method of claim 5, the weights adjusted according to a least-squares fitting procedure.

7. The method of claim 5, the weights adjusted by computing a kernel matrix.

8. The method of claim 5, the weights adjusted based upon an estimate of location uncertainty associated with each identified location.

9. The method of claim 5, the weights comprising a plurality of weights for computing an x location and a plurality of weights for computing a y location.

10. The method of claim 1, the regression function further comprises additional parameters that are computed from a centroid of the identified locations.

11. The method of claim 1, the signal properties comprise signal strengths and are wireless radio signals transmitted from wireless transceivers.

12. The method of claim 11, the wireless transceivers operating in accordance with an IEEE 802.11 standard.

13. The method of claim 1, wherein a subset of the new location(s) are inaccessible at the time of calibration, the inaccessible locations including at least one of a room, a plurality of rooms distributed throughout a floor, and a plurality of rooms proximately located on a floor.

14. A method of calibrating a wireless device location measurement system, comprising:
  accessing at least one wireless transmitting device;
  logging signal strength data for the at least one wireless transmitting device; and
  generating a regression function based upon the signal strength data, the regression function comprising a plurality of kernel functions to compute the difference between a vector of observed signal properties and a vector of stored signal properties, the kernel functions utilized to estimate new location(s).

15. The method of claim 14, the signal strength data logged from a plurality of different locations within range of the at least one transmitting device.

16. A location system that observes signal properties to determine a new location(s), comprising:
  means for measuring signal properties related to identified locations; and
  means for generating a regression function comprising a plurality of kernel functions based at least in part upon the signal properties, the regression function estimating new location(s) as a function of the difference between observed signal properties and stored signal properties.

17. A location system that uses observed signal properties to determine new location(s), comprising:
  a measuring component for measuring signal properties related to identified locations; and
  a regression component for generating a regression function based at least in part upon the signal properties, the function estimating new location(s) based upon observed signal property data, the regression function comprising a plurality of kernel functions, each kernel function computing the difference between a vector of observed signal properties and a vector of stored signal properties.

18. The system of claim 17, the kernel functions being isotropic Gaussian kernel functions.

19. The system of claim 17, wherein the vector of stored properties is computed by clustering a plurality of vectors of measured signal properties.

20. The system of claim 17, the regression function comprising weights, and the regression component comprising a fitting component for fitting the regression function to the measured signal properties by adjusting the weights.

21. The system of claim 20, the fitting component comprising a least-squares fitting component.

22. The system of claim 20, the fitting component comprising a component for computing a kernel matrix.

23. The system of claim 20, the fitting component receives as input an estimate of the location uncertainty associated with each identified location.

24. The system of claim 20, the weights comprising a plurality of weights for computing an x location and a plurality of weights for computing ay location.

25. The system of claim 20, the regression function further comprising additional parameters that are computed from the centroid of the identified locations.

26. The system of claim 17, the signal properties comprise signal strengths and are wireless signals transmitted from wireless transceivers.

27. The system of claim 26, the wireless transceivers operate in accordance with an IEEE 802.11 standard.

28. The system of claim 17, further comprising a subset of the new location(s) that are inaccessible at the time of calibration, the inaccessible locations including at least one of a room, a plurality of rooms distributed throughout a floor, and a plurality of rooms proximately location on a floor.

29. A computer implementing the system of claim 17.

30. A computer for calibrating a system that uses signal properties to estimate new location(s), comprising:
  means for measuring the signal properties related to identified locations; and
  means for regressing, the regressing means generating a regression function based at least in part on the measured signal properties, the regression function comprising a plurality of kernel functions, each kernel function computing the difference between a vector of observed signal properties and a vector of stored signal properties to estimate new location(s).

31. The computer of claim 30, the means for regressing further comprising means for clustering the signal properties for use by the regression algorithm.

32. The computer of claim 30, the means for regressing further comprising means to separate the measured signal properties into a training set and a test set.

33. The computer of claim 30, the means for regressing further comprising means for generating a kernel matrix from the training set.

34. The computer of claim 30, the measured signal properties comprising signal strengths.

35. A method of calibrating a system that is used to determine new location(s) depending on observed signal properties, comprising:
  measuring signal properties related to identified locations associated with one or more wireless devices, which measured signal properties are observed signal properties; and
  generating a regression function comprising a plurality of kernel functions devices, the regression function estimating new location(s) associated with new wireless devices as a function of the observed signal properties and of stored signal properties.

36. A method of calibrating a system that is used to determine new location(s) depending on observed signal properties, comprising:
  measuring signal properties related to identified locations associated with one or more wireless devices using a portable computer, which measured signal properties are observed signal properties; and
  generating a regression function on the portable computer comprising a plurality of kernel functions, the function estimating new location(s) associated with new wireless devices as a function of the observed signal properties and of stored signal properties.

* * * * *